United States Patent
Raghuraman et al.

(10) Patent No.: US 12,173,233 B2
(45) Date of Patent: Dec. 24, 2024

(54) AMIDE BASED COATING

(71) Applicant: Dow Global Technologies LLC, Midland, MI (US)

(72) Inventors: Arjun Raghuraman, Pearland, TX (US); Sachit Goyal, Houston, TX (US); Phillip S. Athey, Lake Jackson, TX (US); Harshad M. Shah, Missouri City, TX (US); Juan Carlos Medina, Lake Jackson, TX (US); William A. Koonce, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/098,899

(22) PCT Filed: May 24, 2017

(86) PCT No.: PCT/US2017/034275
§ 371 (c)(1),
(2) Date: Nov. 5, 2018

(87) PCT Pub. No.: WO2017/213855
PCT Pub. Date: Dec. 14, 2017

(65) Prior Publication Data
US 2024/0279536 A1    Aug. 22, 2024

Related U.S. Application Data

(60) Provisional application No. 62/347,252, filed on Jun. 8, 2016.

(51) Int. Cl.
*C09K 8/80*    (2006.01)

(52) U.S. Cl.
CPC .................................. *C09K 8/805* (2013.01)

(58) Field of Classification Search
CPC ....................................................... C09K 8/805
See application file for complete search history.

(56) References Cited

U.S. PATENT DOCUMENTS

| | | | |
|---|---|---|---|
| 3,523,143 A | 8/1970 | Kwong | |
| 4,156,065 A * | 5/1979 | Onder | C08G 73/14 564/138 |

(Continued)

FOREIGN PATENT DOCUMENTS

| | | |
|---|---|---|
| WO | 2007039758 | 4/2007 |
| WO | 2012010627 | 1/2012 |

(Continued)

OTHER PUBLICATIONS

"Hydraulic Fracturing: How it Works," https://fracfocus.org/hydraulic-fracturing-how-it-works/hydraulic-fracturing-process, Pennsylvania Department of Environmental Protection, 2010.

(Continued)

*Primary Examiner* — Angela M DiTrani Leff
*Assistant Examiner* — Avi T Skaist

(57) ABSTRACT

A coated article comprises an article, and one or more amide based coatings on an outer surface of the proppant particle, the amide based coating include the reaction product of an isocyanate component that includes at least one isocyanate and a carboxylic acid component that includes one or more poly-carboxylic acids.

10 Claims, 1 Drawing Sheet

(56) References Cited

U.S. PATENT DOCUMENTS

| | | | |
|---|---|---|---|
| 4,937,366 | A | 6/1990 | Nodelman |
| 5,330,005 | A | 7/1994 | Card et al. |
| 5,697,440 | A | 12/1997 | Weaver et al. |
| 5,853,048 | A | 12/1998 | Weaver et al. |
| 7,032,667 | B2 | 4/2006 | Nguyen et al. |
| 8,770,294 | B2 | 7/2014 | Tanguay et al. |
| 8,993,489 | B2 | 3/2015 | McDaniel et al. |
| 2005/0051332 | A1 | 3/2005 | Nguyen et al. |
| 2011/0118155 | A1 | 5/2011 | Pisklak et al. |
| 2013/0225708 | A1 | 8/2013 | Prissok et al. |
| 2014/0274819 | A1 | 9/2014 | McCrary et al. |
| 2014/0338906 | A1 | 11/2014 | Monastiriotis et al. |
| 2016/0257876 | A1* | 9/2016 | Zielinski ............... C09K 8/805 |
| 2020/0017760 | A1* | 1/2020 | Goyal ................. C09D 175/04 |

FOREIGN PATENT DOCUMENTS

| | | |
|---|---|---|
| WO | 2013059793 | 4/2013 |
| WO | 2014052459 | 4/2014 |
| WO | 2014092986 A2 | 6/2014 |
| WO | 2016070044 | 5/2016 |

OTHER PUBLICATIONS

Montgomery, C. T., et. al., "Hydraulic Fracturing: History of an Enduring Technology," J. Pet. Technol. 2010, p. 26-28, 30-32, v. 62.

Stephenson, C. J., et. al., "Effective Proppant Flowback Control Following Hydraulic Fracturing Treatments in Shallow Reservoirs," Society of Petroleum Engineers, 2003.

Stephenson, C. J., et. al., "Reliable Proppant Flowback Control for Low-Stress, Low-Temperature Reservoirs," Society of Petroleum Engineers, 2003.

Ramones, M., et. al., "Innovative Fiber-Based Proppant Flowback Control Technique Unlocks Reservoir Potential," Society of Petroleum Engineers, 2014.

Stephenson, C. J., et. al., "Increased Resistance to Proppant Flowback by Adding Deformable Particles to Proppant Packs Tested in the Laboratory," Society of Petroleum Engineers, 1999.

Sasaki, K., et. al., "Facile Amide Bond Formation from Carboxylic Acids and Isocyanates," Organic Letters, 2011, p. 2256-2259, v. 13 No. 9.

McGrew, L. A., et. al., "Reaction of Benzoyl Isocyanate with a Phospholene Oxide Catalyst," The Journal of Organic Chemistry, 1964, p. 3002-3004, v. 29, No. 10.

\* cited by examiner

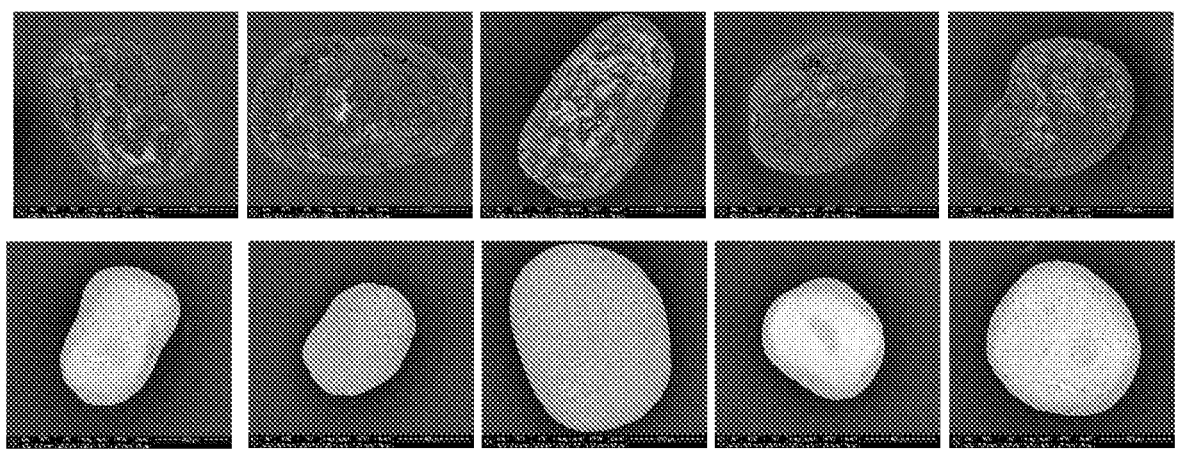

AMIDE BASED COATING

FIELD

Embodiments relate to amide based coatings for articles (such as proppants) articles that have the amide based coatings thereon, methods of making the amide based coatings, and methods of coating the articles with the amide based coatings.

INTRODUCTION

Polymeric protective coatings (which include set in place coatings, spray coatings, powder coatings, and paints) may be used to protect metal and concrete substrates from corrosion by providing a barrier between a corrosive environment and a substrate. The protective coatings may be designed to minimize the permeation through the polymer of corrosive species commonly found in aqueous or organic media. It is proposed that the protective coating may enable recovery of materials such as heavy metals and/or sulfides. Accordingly, it is proposed to develop coating technologies for enabling such recovery.

Further, well fracturing is a process of injecting a fracturing fluid at high pressure into subterranean formations such as subterranean rocks, well holes, etc., so as to force open existing fissures and extract a crude product such as oil or gas therefrom. Proppants are solid material in particulate form for use in well fracturing. Proppants should be strong enough to keep fractures propped open in deep hydrocarbon formations, e.g., during or following an (induced) hydraulic fracturing treatment. Thus, the proppants act as a "propping agent" during well fracturing. The proppants may be introduced into the subterranean formations within the fracturing fluid. The proppants may be coated for providing enhanced properties such as hardness and/or crush resistance. It is further desired to find coatings that provide further improved proppant flowback control.

Proppant flowback refers to dislodging of proppants followed by transport up a well hole with the flowback water. Such proppant flowback may occur, e.g., during well cleanup or after well completion, and may lead to undesirable deposits (such as in casings) and/or failure of electrical submersible pumps. Further, proppant flowback may negatively impact proppant pack conductivity and/or result in pinching off the well hole. Therefore, there is a need for cost-effective technologies to reduce, minimize, and/or prevent such proppant flowback, while not negatively impacting proppant handling (e.g., remain substantially free-flowing during storage and transportation). A proposed method is to a polymeric coating formatted from a bond only under the high temperature conditions in the subterranean formations. However, such high temperature activated polymeric coating can only be used in subterranean formations that meet the specific requirements for activation of the coating, otherelse a higher amount of proppant flowback may be realized. Accordingly, it is proposed to develop flowback control technologies that are usable in relatively lower temperature subterranean formations, while retaining handling characteristics.

SUMMARY

Embodiments may be realized by providing a coated article that comprises an article, and one or more amide based coatings on an outer surface of the proppant particle, the amide based coating include the reaction product of an isocyanate component that includes at least one isocyanate and a carboxylic acid component that includes one or more poly-carboxylic acids.

BRIEF DESCRIPTION OF THE DRAWINGS

Features of the embodiments will become more apparent to those of ordinary skill in the art by describing in detail exemplary embodiments thereof with reference to the attached figures, in which:

FIG. 1 illustrates SEM analysis at 10.0 kV of ten different samples of coated sand with scale bars, as indicated.

DETAILED DESCRIPTION

It is proposed to use an amide based coating. The amide based coating is derived from the reaction between a carboxylic acid and an isocyanate, which results in an amide bond and $CO_2$ gas. For example, embodiments relate to proppant coatings that are formed from the reaction of a polycarboxylic acid and a polyisocyanate. Such resin coated proppants out of these compositions may display sufficient bond strength at temperatures as low as 50° C. Additionally, when incorporated with a suitable inorganic filler, such coatings may be utilized to capture contaminates such as 100% of $H_2S$ from aqueous media containing.

For example, the amide based coating may be an amide copolymer coating. The amide based coating may be derived from the reaction between a carboxylic acid and an isocyanate, which results in an amide bond and $CO_2$ gas. The amine bond forming reaction is as shown in the Schematic below.

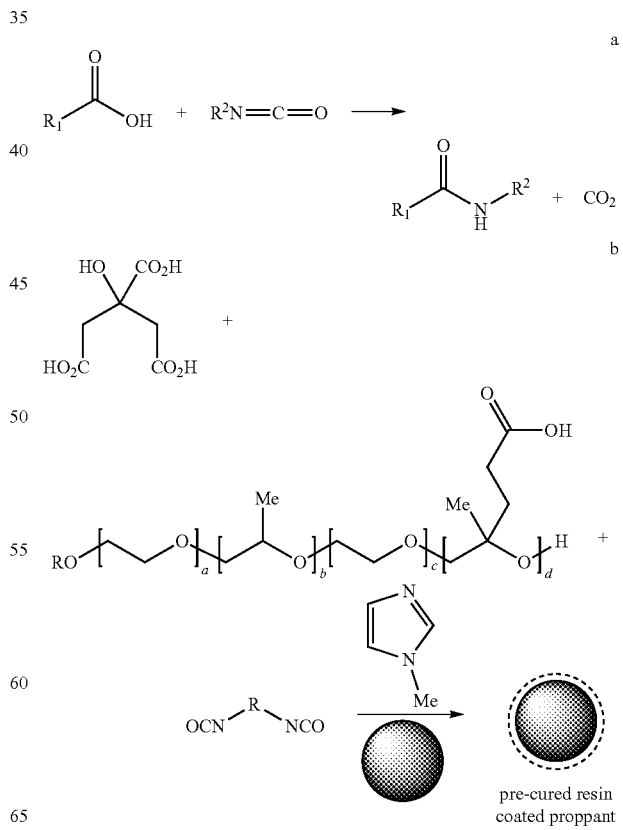

Referring to the above, Schematic (a) illustrates the reaction between a carboxylic acid and an isocyanate. Further, Schematic (b) illustrates an exemplary route that may be used to prepare pre-cured resin coated proppants according to an exemplary embodiment that utilizes the reaction between a carboxylic acid and an isocyanate.

For example, the amide based coating may be prepared using a carboxylic acid based copolymer that is prepared using one or more polyols, such as a polyester, polycarbonate, and/or polyether polyol.

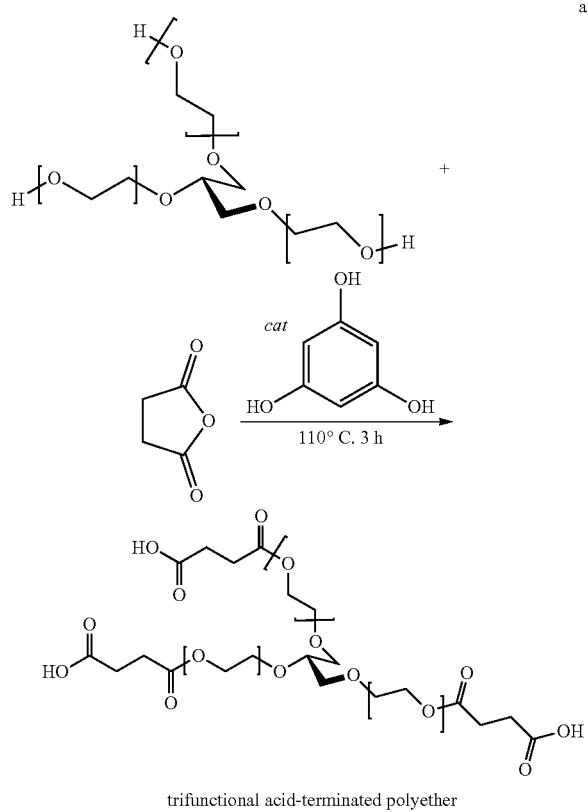

a

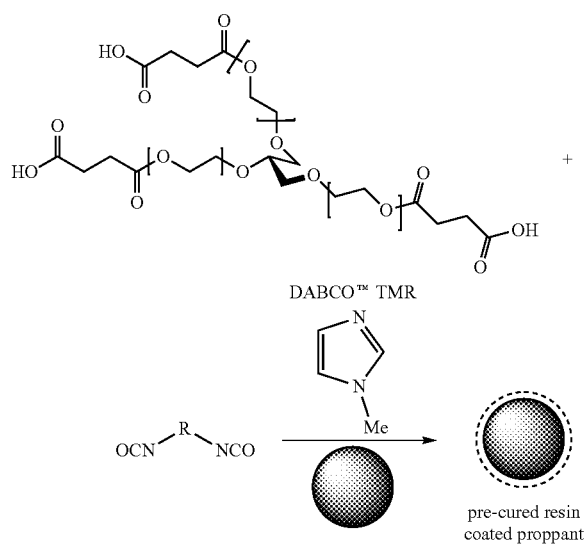

b

Referring to the above, Schematic (a) illustrates an exemplary route that may be used to prepare to synthesize of acid terminated polyethers. Further, Schematic (b) illustrates an exemplary route that may be used to prepare the reaction of acid-terminated polyether with isocyanate to generate an amide based coating.

The coated article may include one of more coatings that allow for dual function coating that provide the benefit of controlled release of an additive and/or capture of containments. The one or more coatings may comprise from 0.5 wt % to 10.0 wt % (e.g., 0.5 wt % to 5.0 wt %, 0.5 wt % to 4.0 wt %, 0.5 wt % to 3.5 wt %, etc.) of a total weight of the coating article. In exemplary embodiments, coated articles such as proppants, include an underlying coating formed on a core (e.g., directly on so as to encompass and/or substantially encompass). The core may be a proppant core, such as sand. According to exemplary embodiments, the coated article includes at least one amide based coating.

In exemplary embodiments, embodiment (a) includes an underlying additive based coating (e.g., including at least one well treatment agent) coated on an outer surface of an article such as a proppant sand particle and an overlying polymer resin based coating coated on the underlying additive based coating. Embodiment (b) includes a single coating that is based on both an additive and the polymer resin. In Embodiment (b), the additive may be dispersed in the polymer resin matrix. The additive may be chemically linked to the polymer resin. For embodiment (a), the underlying additive based coating may be directly on an outermost surface of the article (such as proppant particle) and the overlying polymer resin based coating may be directly on the underlying additive based coating, opposing the outermost surface of the article. For embodiment (a), the overlying polymer resin based coating may form an outermost surface of the coated article, with the underlying additive based coating directly under the overlying polymer resin based coating, such that other coatings may be between the outermost surface of the article and the underlying additive based coating. For embodiment (b), the single coating may be directly on an outermost surface of the article (such as proppant particle) and/or may form an outermost surface of the coated article.

The coated article may provide the benefit of being formulated to maintain its properties even when exposed to relatively low temperatures for down well applications, e.g., to temperatures of near 50° C. and/or less than 70° C. The performance of coatings for proppants, especially in down well applications at higher temperatures and elevated pressures (such as in less than 6000 psig), may be further improved by designing a multilayer coating structure, which may include one layer that may be permeable or semipermeable and another layer composed of polymer resin matrix that can retain a high storage modulus at high temperatures. Further, the proppant article may be coated with additional coatings and/or additional additives, such as additives for recovery and/or removal of other contaminates.

The amide based coating may be formed on a pre-formed polymer resin coated article (such as a proppant) or may be formed immediately after and/or concurrent with forming the amide coated article. The amide based coating may be applied to various articles that include the proppant and/or other base substrates. The amide based coating may act as a permeable polymer resin, with respect to the one or more additives. The amide based coating may enable capturing of containments, such as heavy metals and/or sulfides. The amide based coating may enable delayed released of a majority amount of the one or more additives embedded therewithin. For example, at least one additive may be rendered immobile on an outer surface of the proppant particle and/or rendered immobile within the amide based polymer matrix, but as over a period of time the additive may be released/move through the polymer resin coating, so as to be released into the surrounding environment (e.g., into a fracturing fluid).

Amide Based Coatings

The amide based coating, which may be a coating on (e.g., directly on) an outer surface of an article such as a proppant particle. The coated article such as the proppant particle may optional include additional coats/layers, such as on or under the amide based coating. In exemplary embodiments, the amide based coating may include at least additive embedded on and/or within a polymer resin matrix. The one or more additives may be added during a process of forming the amide based coating and/or may be sprinkled onto a previously coated solid core proppant particle to form the amide based coating in combination with an additive based coating. For example, the one or more additives may be incorporated into an isocyanate-reactive component for forming the amide based coating, an isocyanate component (e.g., a polyisocyanate and/or a prepolymer derived from an isocyanate and a prepolymer formation isocyanate-reactive component) for forming the amide based coating, the prepolymer formation isocyanate-reactive component, and/or a prepolymer derived from an isocyanate and a one component system formation isocyanate-reactive component.

Optionally, the one or more additives may be provided in a carrier polymer when forming controlled release polymer resin based coating. Exemplary carrier polymers include simple polyols, polyether polyols, polyester polyols, liquid epoxy resin, liquid acrylic resins, polyacids such as polyacrylic acid, a polystyrene based copolymer resins (exemplary polystyrene based copolymer resins include crosslinked polystyrene-divinylbenzene copolymer resins), Novolac resins made from phenol and formaldehyde (exemplary Novolac resins have a low softening point), and combinations thereof. Additives known to those of ordinary skill in the art may be used. Exemplary additives include moisture scavengers, UV stabilizers, demolding agents, antifoaming agents, blowing agents, adhesion promoters, curatives, pH neutralizers, plasticizers, compatibilizers, flame retardants, flame suppressing agents, smoke suppressing agents, and/or pigments/dyes.

With respect to the amide based coating, the polymer resin/matrix is the reaction product of an isocyanate component and an isocyanate-reactive component that includes (e.g., consistent essentially of) one or more carboxylic acids (e.g., one or more polycarboxylic acids). The isocyanate component may include at least one polyisocyanate and/or at least one isocyanate-terminated prepolymer and the isocyanate-reactive component may include at least one polyol such as a polyether polyol. Similarly, an optional one or more amide based undercoats (e.g., that includes the one or more additives embedded therewithin), may be the reaction product of a same or a different isocyanate component and a same or a different isocyanate-reactive component. For example, the optional one or more amide based undercoats may include one or more additives, such that the underlying layer includes a amide resin based matrix. In exemplary embodiments, a single isocyanate component may be used to form both an amide based undercoat and a separately formed amide based matrix. In other exemplary embodiments, one isocyanate-reactive component and one isocyanate component may be used to form the amide based undercoat and additional isocyanate-reactive and isocyanate components may be used to form the overlaying amide based coating.

The mixture for forming the polyurethane based matrix may have an isocyanate index that is at least 60 (e.g., at least 100). For example, the isocyanate index may be from 60 to 2000 (e.g., 65 to 1000, 65 to 300, 65 to 250, 70 to 200, 100 to 900, 100 to 500, etc.) The isocyanate index is the equivalents of isocyanate groups (i.e., NCO moieties) present, divided by the total equivalents of isocyanate-reactive carboxylic acid containing groups (i.e., O=C—OH moieties) present, multiplied by 100. Considered in another way, the isocyanate index is the ratio of the isocyanate groups over the isocyanate reactive hydrogen atoms from a carboxylic acid present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

The isocyanate component for forming the polyurethane resin (including a polyurethane/epoxy hybrid based matrix) and/or the polyurethane based undercoat may include one or more polyisocyanates, one or more isocyanate-terminated prepolymer derived from the polyisocyanates, and/or one or more quasi-prepolymers derived from the polyisocyanates. Isocyanate-terminated prepolymers and quasi-prepolymers (mixtures of prepolymers with unreacted polyisocyanate compounds), may be prepared by reacting a stoichiometric excess of a polyisocyanate with at least one polyol. Exemplary polyisocyanates include aromatic, aliphatic, and cycloaliphatic polyisocyanates. According to exemplary embodiments, the isocyanate component may only include aromatic polyisocyanates, prepolymers derived therefrom, and/or quasi-prepolymers derived therefrom, and the isocyanate component may exclude any aliphatic isocyanates and any cycloaliphatic polyisocyanates. The polyisocyanates may have an average isocyanate functionality from 1.9 to 4 (e.g., 2.0 to 3.5, 2.8 to 3.2, etc.). The polyisocyanates may have an average isocyanate equivalent weight from 80 to 160 (e.g., 120 to 150, 125 to 145, etc.) The isocyanate-terminated prepolymer may have a free NCO (isocyanate moiety) of 10 wt % to 35 wt %, 10 wt % to 30 wt %, 10 wt % to 25 wt %, 10 wt % to 20 wt %, 12 wt % to 17 wt %, etc.

Exemplary isocyanates include toluene diisocyanate (TDI) and variations thereof known to one of ordinary skill in the art, and diphenylmethane diisocyanate (MDI) and variations thereof known to one of ordinary skill in the art. Other isocyanates known in the polyurethane art may be used, e.g., known in the art for polyurethane based coatings. Examples, include modified isocyanates, such as derivatives that contain biuret, urea, carbodiimide, allophonate and/or isocyanurate groups may also be used. Exemplary available isocyanate based products include PAPI™ products, ISONATE™ products and VORANATE™ products, VORASTAR™ products, HYPOL™ products, TERAFORCE™ Isocyanates products, available from The Dow Chemical Company.

The isocyanate-reactive component for forming the amide based coating includes one or more carboxylic acids, e.g., one or more poly-carboxylic acids. For example, the isocyanate-reactive component may include one or more poly-carboxylic acids (such as a simple carboxylic acid and/or a poly-carboxylic acid copolymer) that has a number average molecular weight from 90 g/mol to 10,000 g/mol. For example, the one or more poly-carboxylic acids may include one or more simple poly-carboxylic acids (also referred to as a poly-carboxylic acid monomers) such as a dicarboxylic acid and a tricarboxylic acid such as citric acid. For example, the dicarboxylic acid may have the general formula $HO_2C(CH_2)_nCO_2H$.

For example, the one or more poly-carboxylic acids may include one or more poly-carboxylic acid copolymers that include two or more carboxylic acid end groups and a polymer backbone. Whereas, the carboxylic acid end groups may be referred to as a measure of the nominal carboxylic acid functionality of the copolymer. For example, the nominal carboxylic acid functionality may be from 2 to 8 (e.g., 2 to 6, 2 to 5, 2 to 4, and/or 2 to 3). For example the backbone may be an ether, ester, and/or carbonate based backbone. The ether, ester, and/or carbonate backbone may be non-reactive with the isocyanate-component. For example, the ether backbone may be a polyether derived from reaction of propylene oxide, ethylene oxide, and/or butylene oxide with an initiator. The ether backbone may have a number average molecular weight from 60 g/mol to less than 9950 g/mol. The poly carboxylic acid copolymer may be the reaction product of one or more polyether polyols and one or more anhydrides. Furthermore, the poly carboxylic acid can be derived from polyether polyols by direct oxidation of alcohol end groups.

The one or more poly-carboxylic acids may be pre-made as a blend prior to forming the amide based coating. For example, at least one poly-carboxylic acid copolymer and at least one poly-carboxylic acid monomer may be blended and maintained at a high temperature, such as at least 80° C.) over an extended period of time (such as at least 2 hours) to form the pre-made blend.

The isocyanate-reactive component for forming the polyurethane resin and/or the polyurethane based undercoat may further include a catalyst component that includes one or more catalysts. Catalysts known in the art, such as trimerization catalysts known in art for forming polyisocyanates trimers and/or urethane catalyst known in the art for forming polyurethane polymers and/or coatings may be used. In exemplary embodiments, the catalyst component may be pre-blended with the isocyanate-reactive component, prior to forming a coating.

Exemplary trimerization catalysts include, e.g., amines (such as tertiary amines), alkali metal phenolates, alkali metal alkoxides, alkali metal carboxylates, and quaternary ammonium carboxylate salts. The trimerization catalyst may be present, e.g., in an amount less than 5 wt %, based on the total weight of the isocyanate-reactive component. Exemplary urethane catalyst include various amines, tin containing catalysts (such as tin carboxylates and organotin compounds), tertiary phosphines, various metal chelates, and metal salts of strong acids (such as ferric chloride, stannic chloride, stannous chloride, antimony trichloride, bismuth nitrate, and bismuth chloride). Exemplary tin-containing catalysts include, e.g., stannous octoate, dibutyl tin diacetate, dibutyl tin dilaurate, dibutyl tin dimercaptide, dialkyl tin dialkylmercapto acids, and dibutyl tin oxide. The urethane catalyst, when present, may be present in similar amounts as the trimerization catalyst, e.g., in an amount less than 5 wt %, based on the total weight of the isocyanate-reactive component. The amount of the trimerization catalyst may be greater than the amount of the urethane catalyst. For example, the catalyst component may include an amine based trimerization catalyst and a tin-based urethane catalyst.

Other exemplary catalyst include amide forming catalysts that are known in the art, such as N-methyl imidazole and Lewis bases.

Other Coatings

The coated particle may include additional coatings in addition to the additive based coating and the controlled released polymer resin based coating. A total amount of all the optional coatings may be from 0.5 wt % to 7.0 wt % (e.g., 1.0 wt % to 4.0 wt %, 1.0 wt % to 3.5 wt %, 1.5 wt % to 3.0 wt %, 2.0 wt % to 3.0 wt %, etc.), based on the total weight of the coated article such as coated proppant.

For example, a controlled release polymer resin based coating such as discussed in U.S. Provisional Patent Application No. 62/312,113, which may be the top coat (outermost coating) forming the coated article such as proppant particle. The controlled released polymer resin based coating includes one or more well treatment agents that are embedded in a polymer resin matrix, the matrix may include the amide based material described above and/or a polyurethane resin, epoxy resin, phenolic resin, and/or furan resin.

Exemplary well treatment agents are described as follows: (1) With respect to scale inhibitor, it is meant a chemical additive that acts to reduce the rate of and/or prevent the precipitation and aggregation of slightly insoluble formations on the walls of systems, e.g., systems used in a well fracturing process. (2) With respect to wax inhibitor, it is meant a chemical additive that acts to reduce the rate of and/or prevent the precipitation out of wax and/or paraffin from a fluid, e.g., the wax and/or paraffin may be a natural compound found in the crude product obtained during a well fracturing process. (3) With respect to pour point depressant, it is meant a chemical additive that lowers the pour point of a crude product obtained during a well fracturing process, whereas the pour point is the lowest temperature at which the product will pour when cooled under defined conditions and may be indicative of the amount of wax in the product (at low temperatures the wax may separate, inhibiting flow). (4) With respect to asphaltene inhibitor, it is meant a chemical additive that acts to reduce the rate of and/or prevent the precipitation out of asphaltene (such as destabilized asphaltene), e.g., whereas asphaltene molecules may be found in the crude product obtained during a well fracturing process. (5) With respect to asphaltene dispersant, it is meant a chemical additive that acts to increase the fluidity of the crude product that includes precipitated asphaltene, e.g., whereas asphaltene molecules may be found in the crude product obtained during a well fracturing process. (6) With respect to corrosion inhibitor, it is meant a chemical additive that acts to reduce the rate of and/or prevent corrosive effect of acids on metals and/or metal alloy based components used in systems, e.g., systems used in a well fracturing process. (7) With respect to biocide (also referred to as a disinfectant), it is meant a chemical additive that acts to reduce the rate of and/or prevent the growth of bacteria/microbes in the well, which bacteria may interfere with a process, e.g., a well fracturing process. (8) With respect to viscosity modifier (also referred to as a viscosity improver), it is meant a chemical additive that is sensitive to temperature, e.g., such that at low temperatures, the molecule chain contracts and does not impact the fluid viscosity and at high temperatures the molecule chain relaxes and an increase in viscosity occurs. (9) With respect to de-emulsifier (also referred to as emulsion preventers), it is meant a chemical additive that reduces and/or minimizes interfacial tensions within the crude product obtained during a well fracturing process. For example, the de-emulsifier may lower the shear viscosity and the dynamic tension gradient of an oil-water interface in the crude product.

For example, a heavy metal recovery coating such as discussed in priority document, U.S. Provisional Patent Application No. 62/186,645 and/or a sulfide recovery coating such as discussed in priority document, U.S. Provisional Patent Application No. 62/287,037 may be included.

In particular, the heavy metal recovery coating may have heavy metal recovery crystals embedded within a polymer resin matrix, which is coated onto a solid core proppant particle. The metal sulfate crystals on the proppant particle may aid in heavy metal recovery by causing heavy metals, such as particles of radioactive radium, to partition onto the coated proppant and away from the contaminated water. The selective post-precipitation of heavy metals such radium ions onto previously formed crystals (e.g., barite crystals) by lattice replacement (lattice defect occupation), adsorption, or other mechanism, is distinctly different from other capture modes such as ion exchange or molecular sieving. For example, the post precipitation of heavy metals such as radium on pre-formed barite crystals is selective for radium because of similar size and electronic structure of radium and barium. In exemplary embodiments, the heavy metal recovery crystals may form a crystalline structure that is appropriately sized to hold the heavy metals such as radium thereon or therewithin. Therefore, the heavy metal recovery crystals may pull the radium out of fracturing fluid and hold the ions on or within the heavy metal recovery coating, so as to reduce radium content in the fracturing fluid.

The sulfide recovery coating may provide a system in which sulfides such as hydrogen sulfide may be removed from contaminated water, e.g., can be absorbed into/onto a matrix and/or may be chemically altered. For example, the sulfide may be chemically altered to form sulfur dioxide. The sulfide capturing agent may be embedded within a polymer resin matrix, which is coated onto a proppant particle, such that optionally the sides of the sulfide capturing agent are encapsulated by the polymer resin. The sulfide capturing agent on the proppant particle may aid in the recovery and/or removal of sulfides from the contaminated water. The sulfide capturing agents (e.g., sulfide capturing crystals) are solids at room temperature (approximately 23° C.). The sulfide capturing crystals may have a melting point greater than 500° C., greater than 800° C., and/or greater than 1000° C. The sulfide capturing agents, such as the sulfide capturing crystals, may have an average particle size of less than 5 µm (e.g., less than 4 µm, less than 2 µm, less than 1 µm, etc.) The polymer resin matrix having the sulfide capturing agent may act as a permeable or semi-permeable polymer resin, with respect to hydrogen sulfide and/or sulfur ions. For example, the hydrogen sulfide and/or sulfur ions may be rendered immobile on an outer surface of the proppant particle and/or rendered immobile within the polymer resin matrix. The polymer resin matrix, polymer coating, and/or the process used to prepare coated proppants may be designed to retain captured sulfide on or within the coatings of the proppants and keep the product in the fracture.

In exemplary embodiments, the sulfide recovery coating may include both the sulfide capturing agent and the heavy metal recovery crystals embedded within a same polymer resin matrix, to form both the sulfide recovery coating and the heavy mental recovery coating.

For example, under or combined with the controlled release polymer resin based coating, may optionally be at least one additional coating/layer derived from one or more preformed isocyanurate tri-isocyanates may be formed, as discussed in U.S. Provisional Patent Application No. 62/140,022. In embodiments, the additional layer is derived from a mixture that includes one or more preformed isocyanurate tri-isocyanates and one or more curatives. The preformed isocyanurate tri-isocyanate may also be referred to herein as an isocyanate trimer and/or isocyanurate trimer. By preformed it is meant that the isocyanurate tri-isocyanate is prepared prior to making a coating that includes the isocyanurate tri-isocyanate there within. Accordingly, the isocyanurate tri-isocyanate is not prepared via in situ trimerization during formation of the coating. In particular, one way of preparing polyisocyanates trimers is by achieving in situ trimerization of isocyanate groups, in the presence of suitable trimerization catalyst, during a process of forming polyurethane polymers. For example, the in situ trimerization may proceed as shown below with respect to Schematic (a), in which a diisocyanate is reacted with a diol (by way of example only) in the presence of both a urethane catalyst and a trimerization (i.e. promotes formation of isocyanurate moieties from isocyanate functional groups) catalyst. The resultant polymer includes both polyurethane polymers and polyisocyanurate polymers, as shown in Schematic (a), below.

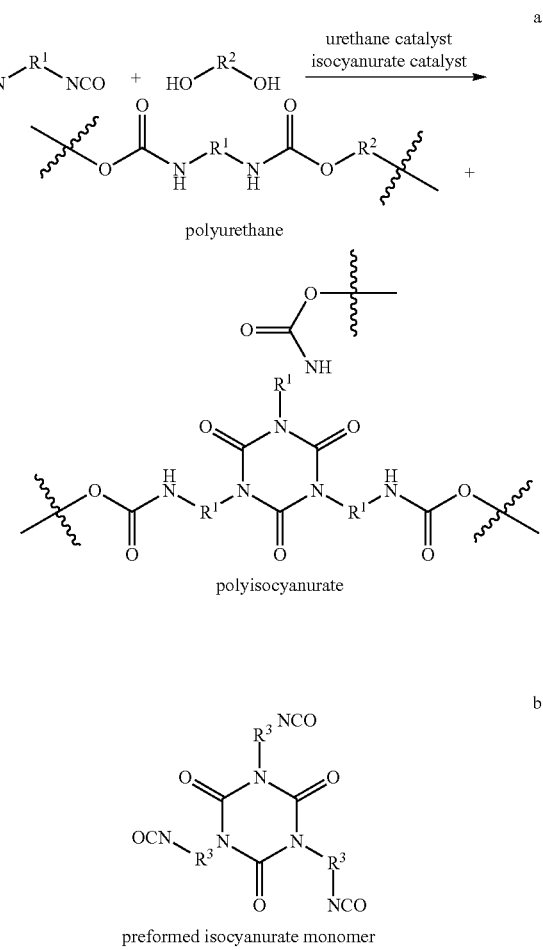

Schematics (a) and (b)

In contrast, referring to Schematic (b) above, in embodiments the preformed isocyanurate tri-isocyanate is provided as a separate preformed isocyanurate-isocyanate component, i.e., is not mainly formed in situ during the process of forming polyurethane polymers. The preformed isocyanurate tri-isocyanate may be provided in a mixture for forming the coating in the form of a monomer, and not in the form of being derivable from a polyisocyanate monomer while forming the coating. For example, the isocyanate trimer may not be formed in the presence of any polyols and/or may be formed in the presence of a sufficiently low amount of polyols such that a polyurethane forming reaction is mainly avoided (as would be understand by a person of ordinary skill in the art). With respect to the preformed isocyanurate tri-isocyanate, it is believed that the existence of isocyanurate rings leads to a higher crosslink density. Further, the higher crosslink density may be coupled with a high decomposition temperature of the isocyanurate rings, which may lead to enhanced temperature resistance. Accordingly, it is proposed to introduce a high level of isocyanurate rings in the coatings for proppants using the preformed isocyanurate tri-isocyanates.

For example, the additional layer may include one or more preformed aliphatic isocyanate based isocyanurate tri-isocyanates, one or more preformed cycloaliphatic isocyanate based isocyanurate tri-isocyanates, or combinations thereof. In exemplary embodiments, the additional layer is derived from at least a preformed cycloaliphatic isocyanate based isocyanurate tri-isocyanate, e.g., the preformed cycloaliphatic isocyanate based isocyanurate tri-isocyanate may be present in an amount from 80 wt % to 100 wt %, based on the total amount of the isocyanurate tri-isocyanates used in forming the additional layer.

Exemplary preformed isocyanurate tri-isocyanates include the isocyanurate tri-isocyanate derivative of 1,6-hexamethylene diisocyanate (HDI) and the isocyanurate tri-isocyanate derivative of isophorone diisocyanate (IPDI). For example, the isocyanurate tri-isocyanates may include an aliphatic isocyanate based isocyanurate tri-isocyanates based on HDI trimer and/or cycloaliphatic isocyanate based isocyanurate tri-isocyanates based on IPDI trimer. Many other aliphatic and cycloaliphatic di-isocyanates that may be used (but not limiting with respect to the scope of the embodiments) are described in, e.g., U.S. Pat. No. 4,937,366. It is understood that in any of these isocyanurate tri-isocyanates, one can also use both aliphatic and cycloaliphatic isocyanates to form an preformed hybrid isocyanurate tri-isocyanate, and that when the term "aliphatic isocyanate based isocyanurate tri-isocyanate" is used, that such a hybrid is also included.

The one or more curatives (i.e., curative agents) may include an amine based curative such as a polyamine and/or an hydroxyl based curative such as a polyol. For example the one or more curatives may include one or more polyols, one or more polyamines, or a combination thereof. Curative known in the art for use in forming coatings may be used. The curative may be added, after first coating the proppant with the preformed aliphatic or cycloaliphatic isocyanurate tri-isocyanate. The curative may act as a curing agent for both the top coat and the undercoat. The curative may also be added, after first coating following the addition of the preformed aliphatic or cycloaliphatic isocyanurate tri-isocyanate in the top coat.

Various optional ingredients may be included in the reaction mixture for forming the controlled release polymer resin based coating, the additive based coating, and/or the above discussed additional coating/layer. For example, reinforcing agents such as fibers and flakes that have an aspect ratio (ratio of largest to smallest orthogonal dimension) of at least 5 may be used. These fibers and flakes may be, e.g., an inorganic material such as glass, mica, other ceramic fibers and flakes, carbon fibers, organic polymer fibers that are non-melting and thermally stable at the temperatures encountered in the end use application. Another optional ingredient is a low aspect ratio particulate filler, that is separate from the proppant. Such a filler may be, e.g., clay, other minerals, or an organic polymer that is non-melting and thermally stable at the temperatures encountered in stages (a) and (b) of the process. Such a particulate filler may have a particle size (as measured by sieving methods) of less than 100 m. With respect to solvents, the undercoat may be formed using less than 20 wt % of solvents, based on the total weight of the isocyanate-reactive component.

Proppants

Exemplary proppants (e.g., proppant particles) include silica sand proppants and ceramic based proppants (for instance, aluminum oxide, silicon dioxide, titanium dioxide, zinc oxide, zirconium dioxide, cerium dioxide, manganese dioxide, iron oxide, calcium oxide, and/or bauxite). Various other exemplary proppant material types are mentioned in literature, such as glass beads, walnut hulls, and metal shot in, e.g., Application Publication No. WO 2013/059793, and polymer based proppants as mentioned by U.S. Patent Publication No. 2011/0118155. The sand and/or ceramic proppants may be coated with a resin to, e.g. to improve the proppant mesh effective strength (e.g., by distributing the pressure load more uniformly), to trap pieces of proppant broken under the high downhole pressure (e.g., to reduce the possibility of the broken proppants compromising well productivity), and/or to bond individual particles together when under the intense pressure and temperature of the fracture to minimize proppant flowback. The proppants to be coated may have an average particle size from 50 $\mu$m to 3000 $\mu$m (e.g., 100 $\mu$m to 2000 $\mu$m).

Proppant particle (grain or bead) size may be related to proppant performance. Particle size may be measured in mesh size ranges, e.g., defined as a size range in which 90% of the proppant fall within. In exemplary embodiments, the proppant is sand that has a mesh size of 20/40. Lower mesh size numbers correspond to relatively coarser (larger) particle sizes. Coarser proppants may allow higher flow capacity based on higher mesh permeability. However, coarser particles may break down or crush more readily under stress, e.g., based on fewer particle-to-particle contact points able to distribute the load throughout the mesh. Accordingly, coated proppants are proposed to enhance the properties of the proppant particle.

The performance of coatings for proppants, especially in downwell applications at higher temperatures (such as greater than 120° C.) and elevated pressures (such as in excess of 6000 psig), may be further improved by designing coatings that retain a high storage modulus at temperatures of up to at least 175° C., which may be typically encountered during hydraulic fracturing of deep strata. The coating may have a glass transition temperature greater than at least 140° C., e.g., may not realize a glass transition temperature at temperatures below 160° C., below 200° C., below 220° C., below 240° C., and/or below 250° C. The resultant coating may not realize a glass transition temperature within a working temperature range typically encountered during hydraulic fracturing of deep strata. For example, the resultant coating may not realize a glass transition temperature within the upper and lower limits of the range from 25° C. to 250° C. Accordingly, the coating may avoid a soft rubbery phase, even at high temperatures (e.g., near 200° C. and/or near 250° C.). For example, coatings that exhibit a glass transition temperature within the range of temperatures typically encountered during hydraulic fracturing of deep strata, will undergo a transition from a glassy to rubbery state and may separate from the proppant, resulting in failure.

Coating Process of Proppants

To coat the article such as the proppant, in exemplary embodiments any optional undercoat layer (e.g., a polyurethane based layer) may be formed first. Thereafter, the amide based coating may be formed on (e.g., directly on) the article/proppant and/or the optional underlying undercoat. In a first stage of forming coated proppants, solid core proppant particles (e.g., which do not have a previously formed resin layer thereon) may be heated to an elevated temperature. For example, the solid core proppant particles may be heated to a temperature from 50° C. to 180° C., e.g., to accelerate crosslinking reactions in the applied coating. The pre-heat temperature of the solid core proppant particles may be less than the coating temperature for the coatings formed thereafter. For example, the coating temperate may be from 40° C. to 170° C. In exemplary embodiments, the coating temperature is at least 85° C. and up to 170° C.

Next, the heated proppant particles may be sequentially blended (e.g., contacted) with the desired components for forming the one or more coatings, in the order desired. For example, the proppant particles may be blended with a formulation that includes one or more additives. Next, the proppant particles may be blended with a first isocyanate-reactive component in a mixer, and subsequently thereafter other components for forming the desired one or more coatings. For an epoxy based matrix, the proppant core particles may be blended with a liquid epoxy resin in the mixer. In exemplary embodiments, a process of forming the one or more coatings may take less than 10 minutes, after the stage of pre-heating the proppant particles and up until right after the stage of stopping the mixer.

The mixer used for the coating process is not restricted. For example, as would be understood by a person of ordinary skill in the art, the mixer may be selected from mixers known in the specific field. For example, a pug mill mixer or an agitation mixer can be used. The mixer may be a drum mixer, a plate-type mixer, a tubular mixer, a trough mixer, or a conical mixer. Mixing may be carried out on a continuous or discontinuous basis. It is also possible to arrange several mixers in series or to coat the proppants in several runs in one mixer. In exemplary mixers it is possible to add components continuously to the heated proppants. For example, isocyanate component and the isocyanate-reactive component may be mixed with the proppant particles in a continuous mixer in one or more steps to make one or more layers of curable coatings.

Any coating formed on the proppants may be applied in more than one layer. For example, the coating process may be repeated as necessary (e.g. 1-5 times, 2-4 times, and/or 2-3 times) to obtain the desired coating thickness. The thicknesses of the respective coatings of the proppant may be adjusted. For example, the coated proppants may be used as having a relatively narrow range of proppant sizes or as a blended having proppants of other sizes and/or types. For example, the blend may include a mix of proppants having differing numbers of coating layers, so as to form a proppant blend having more than one range of size and/or type distribution.

The coated proppants may be treated with surface-active agents or auxiliaries, such as talcum powder or steatite (e.g., to enhance pourability). The coated proppants may be exposed to a post-coating cure separate from the addition of the curative. For example, the post-coating cure may include the coated proppants being baked or heated for a period of time sufficient to substantially react at least substantially all of the available reactive components used to form the coatings. Such a post-coating cure may occur even if additional contact time with a catalyst is used after a first coating layer or between layers. The post-coating cure step may be performed as a baking step at a temperature from 100° C. to 250° C. The post-coating cure may occur for a period of time from 10 minutes to 48 hours.

Coating Process of Other Substrates

Amide based coatings (which include set in place coatings, spray coatings, powder coatings, and paints) may be used to protect surfaces. In an exemplary embodiment, the coating may be a permeable layer, such as a permeable liner. Exemplary permeable liners are discussed in U.S. Provisional Application No. 62/186,671. By permeable it is meant a liquid such as water, may penetrate into the coating. As discussed in U.S. Provisional Application No. 62/186,671, the permeability of the layer may be determined by measuring the glass transition temperature (Tg) of the layer, before and after wetting the liner with water and correlating the Tg measurements to permeability. Another way to measure the liner permeability is using Electrochemical Impedance Spectroscopy (EIS), measures the dielectric properties of a medium as a function of frequency. Yet another way to measure liner permeability is by measuring the weight of the liner before and after exposing it to water at for instance 90° C. for at least 24 hours.

The coating process may involve a batch process, an intermittent process, or a continuous process using equipment well known to those skilled in the art. For example, to coat the base substrate, techniques known in the art may be used such as spraying, brushing (includes rolling), pouring in place, powder coatings, etc. In some instances, the coating composition may be applied form using equipment known to those skilled in the art. In another example, the coating composition may be applied to large tanks and containers using spray equipment know to those skilled in the art. In exemplary embodiments any optional undercoat layer (e.g., an epoxy or polyurethane based layer or primer) may be formed first. Thereafter, the amide based coating may be formed on (e.g., directly on) the base substrate and/or the optional underlying undercoat.

For forming the amide base coating, the components resin may be sprayed or brushed on to the base substrate at a same time. By at a same time it is meant the both the sulfide capturing agent and the polymer resin matrix are applied to the base substrate together (i.e., in a concurrent stage or step).

An exemplary a process of may include the following stages: (1) preparing a coating composition comprising at least one composition for components for forming the amide based coating; and (2) attaching, adhering or bonding the coating composition of stage (1) onto base substrate. Stage (2) may include processing the above coating composition to form a permeable liner on the base substrate by reacting/curing the composition of stage (1). The coating composition may be applied at ambient conditions in the field. Thus, the application of the coating can be done e.g., by brush, by roller, by dipping, by spraying (air-less or air-assisted) using equipment known to those skilled in the art. The coating may be applied in a dry film thickness of from 25 microns to 3000 microns. The coating cures at ambient conditions and may be in service in a period from 1 to 7 days. The coating may be applied to the base substrate in a factory at ambient conditions and optionally baked at a higher temperature (e.g., greater than or equal to 40° C., greater than or equal to 180° C., greater than or equal to 100° C., greater than or equal to 140° C., and/or from 140° C. to 240° C.).

In an exemplary embodiment, the sulfide recovery coating is a one component of two components liquid coating material made from the above composition, whereas the liquid coating is useful for making a coating and/or liner for capturing contaminants. In another exemplary embodiment, the coating functions as a permeable layer for capturing contaminants, which coating is formed on the base substrate and may be made from the liquid coating material. In another exemplary embodiment, the coating is a permeable liner that functions as a permeable layer for capturing contaminants, which permeable liner may be adhered to the base substrate and may be made from the liquid coating material. A coating composition in powder form may be dissolved in a solvent (such as xylene) and then be applied in liquid form.

Depending on the type of components used, the curable composition may be applied in liquid form direct to a metal substrate or a metal substrate coated with a primer (undercoat). The curable composition can be also applied to composite and proppants applications.

All parts and percentages are by weight unless otherwise indicated. All molecular weight information is based on number average molecular weight, unless indicated otherwise.

EXAMPLES

Approximate properties, characters, parameters, etc., are provided below with respect to various working examples, comparative examples, and the materials used in the working and comparative examples.

Polyurethane Examples

For polyurethane based examples, the materials principally used, and the corresponding approximate properties thereof, are as follows:

Sand Northern White Frac Sand, having a 20/40 mesh size.

Carboxylic Acid Copolymer 1 A poly-carboxylic acid copolymer having that is an anionic modified polyalkylene glycol, which is radically grafted by acrylic acid, having an acid functionality of approximately 4.5, and an acid number ranging from 59.5 to 72.9 according to ASTM D-4662 (available as UCON™ EPML-483 from The Dow Chemical Company).

Carboxylic Acid Copolymer 2 A poly-carboxylic acid copolymer that has a nominal carboxylic functionality of 3 and is a lab-synthesized acid-terminated polyether prepared by first, in 1 liter 4 neck RB flask, charged IP 625 Polyol (available from The Dow Chemical Company) to dry it at 90° C. under $N_2$ overnight, which is thereafter found to have a water content of 323 ppm. Next, the indicated amounts of succinic anhydride and 0.05 percent by weight of pyrogallol are charged into the flask. Under a nitrogen blanket, the temperature of the mixture is gradually raised to 90° C. or higher to dissolve the succinic anhydride in the IP 625 Polyol over a period of an hour with stirring at 350 rpm. Then, the temperature of the mixture is raised to 110° C. and held at about 110° C. for 3 hours. Lots of needle shape crystals may be observed on the top of the reactor and in the side arm. A heat gun may be used to get into the liquid twice. After cooling to room temperature, the nitrogen blanket is removed, and the product is analyzed by Acidity and NMR. Yield=1474 grams, LIMS #93215 for Acid #=182.84 mg KOH/g for the sample.

Citric Acid A polycarboxylic acid monomer that is citric acid which is available as 99% pure (available from Fisher Scientific).

Catalyst 1 A 1-methylimidazole catalyst (available from Sigma®).

Catalyst 2 A tertiary amine based catalyst that promotes the polyisocyanurate reaction, i.e., trimerization (available as Dabco® TMR from Air Products®).

Isocyanate A polymeric methylene diphenyl diisocyanate—also referred to as PMDI (available as PAPI™ 27 from The Dow Chemical Company).

Adhesion Promoter An gamma-aminopropyltrimethoxysilane based adhesion promoter (available as Silquest™ A-1100 from Momentive Performance Materials®).

Antiblock An antiblocking additive produced from a naturally occurring sodium-potassium-aluminum silicate feedstock (available as Minbloc® HC 500 from Sibelco Specialty Minerals).

Zinc Oxide A powder that includes zinc oxide, believed to have an aerodynamic particle size from 50-150 nm, (available as MKN-ZnO-050P from MKnano Canada).

Blends of a carboxylic acid, such as the Carboxylic Acid Copolymer 1 and/or 2, with the Citric Acid may be used to adjust the viscosity and acid number of the acid blend used in to for the amid based coating. Referring to Table 1, below, for various blends (each having a total weight of 100 wt %) of Carboxylic Acid Copolymer 1 with the Citric Acid, the measured viscosity and acid number is provided.

TABLE 1

| Weight Percent Citric Acid in blend (wt %) | Viscosity (cP @ 25° C.) | Acid Number (mg KOH/g) |
|---|---|---|
| 10.0 | 17,000 | 143 |
| 13.0 | 25,800 | 165 |
| 16.7 | 40,000 | 200 |

Referring to Table 1, the viscosity and acid number of the blend may be varied by varying the ratio of acids used to form the amide coating. According to exemplary embodiments, ratios of 1:9 to 1:5 by weight of citric acid to the carboxylic acid such as Carboxylic Acid Copolymer 1 (corresponding to 10.0 and 16.7 wt % of citric acid in the blend) may be used to coat proppants. The blends for the above and for the Examples below that include such blends are prepared as a lab sample using the following method. Firstly, the Citric Acid is added to Carboxylic Acid Copolymer 1 in a three-neck glass reactor at the desired ratio by weight. Then, the reactor is purged with nitrogen and the contents are stirred using a mechanical stirrer. The temperature of the reaction mixture is raised to 100° C. using a heating mantle available from Glas-Col. After 3 hours at 100° C., the contents are cooled and drained. In the Examples below, the citric acid and carboxylic acid formed as a pre-made blend prior to forming the amide based coating.

Viscosity measurements are performed on a TA Instruments AR-2000 rheometer with 40 mm cone-plate geometry and 54 µm gap. Data ia collected with a constant temperature at 25° C. at a constant shear rate of 10 sec-1. Acid number is measured using ASTM D-4662, except methanol as the titration solvent versus ethanol/toluene is used by titration with potassium hydroxide.

Amide Based Coatings

The amide based coating is generally prepared by using a process in which from 600 to 750 grams of the Sand is heated to a temperature of up to 180° C. in an oven. Then, the heat Sand is introduced into a KitchenAid® mixer equipped with a heating jacket (configured for a temperature of about 70° C.), to start a mixing process. During the above process, the heating jacket is maintained at 60% maximum voltage (maximum voltage is 120 volts, where the rated power is 425 W and rated voltage is 240V for the heating jacket) and the mixer is set to medium speed (speed setting of 5 on based on settings from 1 to 10). Separately, for the Working Examples in the manner indicated below, a mixture of the blend of the Carboxylic Acid Copolymer 1 or 2 and the Citric Acid is prepared, and then the blend is further mixed with the Catalyst 1 and/or 2 to form the blend with Catalyst. In the mixer, the heated Sand is allowed to attain a temperature of 130-135° C. Next, simultaneously the addition of the Isocyanate addition and addition of the blend with the Catalyst is performed. A free-flowing product is obtained within a range of approximately 3 to 5 minutes. The surface of the resin coated proppants is characterized by ATR-IR spectroscopy and scanning electron microscopy (SEM). Referring to FIG. 1, Scanning electron microscopy images (25 kV) of amide based coating on sand is shown, in which top row (a), the amide based coating is thicker in darker areas and the bottom row (b) uncoated sand is lighter. Individual coating examples are discussed below.

Comparative Example A has a coated structure that includes loss on ignition (LOI) ~3% (as calculated based on the total quantity of resin added to sand), polyamide based coating, isocyanate index of 1.3, and cycle time of 4.5 minutes. The sample is prepared using 750 grams of the Sand heated in an oven to 160° C., then introduced into the KitchenAid® mixer. After temperature of the Sand reaches 125° C., 0.6 mL of the Adhesion Promoter is added to the mixer. Then, 15 seconds from start of addition of the Adhesion Promoter, 20.5 grams of premixed Carboxylic Acid Copolymer 1 (19.5 grams) and Catalyst 1 (1.0 grams) are added simultaneously with 4.0 grams of Isocyanate over a period of 2 minutes. The mixer is stopped after 135 seconds. Material is emptied onto a tray and allowed to cool. Comparative Example B is Coolset® curable resin-coated sand available from Fairmount Santrol.

Working Examples 1 and 2 each have a coated structure that includes LOI ~3.7%, polyamide based coating, isocyanate index of 1.0, and cycle time of 3 minutes. The samples are prepared using 600 grams of the Sand is heated in an oven to 160° C., then introduced into the KitchenAid® mixer. After temperature of the Sand reaches 132° C., 0.6 mL of the Adhesion Promoter is added to the mixer. Then, 15 seconds from start of addition of the Adhesion Promoter, 17.2 grams of premixed acid Carboxylic Acid Copolymer 1/Citric Acid at a ratio of 9:1 (16.5 grams) with Catalyst 1 (0.7 grams) is added simultaneously with 6.0 grams of Isocyanate over a period of 1.25 minutes. The mixer is stopped after 1.5 minutes. Material is emptied onto a tray and allowed to cool.

Working Examples 3 and 4 each have a coated structure that includes LOI ~3%, polyamide based coating, isocyanate index of 1.0, and cycle time of 3 minutes. The samples are prepared using 750 grams of the Sand is heated in an oven to 160° C., then introduced into the KitchenAid® mixer. After temperature of the Sand reaches 135° C., 0.6 mL of the Adhesion Promoter is added to the mixer. Then, 15 seconds from start of addition of the Adhesion Promoter, 17.2 grams of premixed acid Carboxylic Acid Copolymer 1/Citric Acid at a ratio of 9:1 (16.5 grams) with Catalyst 1 (0.7 grams) is added simultaneously with 6.0 grams of Isocyanate over a period of 1.25 minutes. The mixer is stopped after 1.5 minutes. Material is emptied onto a tray and allowed to cool.

Working Example 5 has a coated structure that includes LOI ~3%, polyamide based coating, isocyanate index of 1.25, and cycle time of 3 minutes. The sample is prepared using 750 grams of the Sand is heated in an oven to 160° C., then introduced into the KitchenAid® mixer. After temperature of the Sand reaches 135° C., 0.6 mL of the Adhesion Promoter is added to the mixer. Then, 15 seconds from start of addition of the Adhesion Promoter, 14.9 grams of premixed acid Carboxylic Acid Copolymer 1/Citric Acid at a ratio of 5:1 (14.0 grams) with Catalyst 1 (0.7 grams) and Catalyst 2 (0.2 grams) is added simultaneously with 8.5 grams of Isocyanate over a period of 1.25 minutes. The mixer is stopped after 1.5 minutes. Material is emptied onto a tray and allowed to cool.

Working Example 6 has a coated structure that includes LOI ~3%, polyamide based coating, isocyanate index of 1.25, and cycle time of 3 minutes. The sample is prepared using 750 grams of the Sand is heated in an oven to 160° C., then introduced into the KitchenAid® mixer. After temperature of the Sand reaches 135° C., 0.6 mL of the Adhesion Promoter is added to the mixer. Then, 15 seconds from start of addition of the Adhesion Promoter, 16.6 grams premixed acid Carboxylic Acid Copolymer 1/Citric Acid at a ratio of 9:1 (15.7 grams) with Catalyst 1 (0.7 grams) and Catalyst 2 (0.2 grams) is added simultaneously with 6.8 grams of Isocyanate over a period of 1.25 minutes. The mixer is stopped after 1.5 minutes. Material is emptied onto a tray and allowed to cool.

Working Example 7 has a coated structure that includes LOI ~3%, polyamide based coating, isocyanate index of 1.25, and cycle time of 3 minutes. The sample is prepared using 750 grams of the Sand is heated in an oven to 160° C., then introduced into the KitchenAid® mixer. After temperature of the Sand reaches 135° C., 0.6 mL of the Adhesion Promoter is added to the mixer. Then, 15 seconds from start of addition of the Adhesion Promoter, 15.4 grams of premixed acid Carboxylic Acid Copolymer 2 (14.6 grams) with Catalyst 1 (0.8 grams) is added simultaneously with 7.9 grams of Isocyanate over a period of 1.25 minutes. The mixer was stopped after 1.5 seconds. Material is emptied onto a tray and allowed to cool.

Working Example 8 has a coated structure that includes LOI ~3%, polyamide based coating, isocyanate index of 2, and cycle time of 3 minutes. The sample is prepared using 750 grams of the Sand is heated in an oven to 160° C., then introduced into the KitchenAid® mixer. After temperature of the Sand reaches 135° C., 0.6 mL of the Adhesion Promoter is added to the mixer. Then, 15 seconds from start of addition of the Adhesion Promoter, 13.0 grams of premixed acid Carboxylic Acid Copolymer 2 (12 grams) with Catalyst 1 (0.8 grams) and Catalyst 2 (0.2 grams) are added simultaneously with 10.5 grams of Isocyanate over a period of 1.25 minutes. The mixer is stopped after 1.5 minutes. Material is emptied onto a tray and allowed to cool.

Working Example 9 has a coated structure that includes LOI ~3%, polyamide based coating, isocyanate index of 1.25, and cycle time of 4 minutes. The sample is prepared using 750 grams of the Sand is heated in an oven to 160° C., then introduced into the KitchenAid® mixer. After temperature of the Sand reaches 135° C., 0.6 mL of the Adhesion Promoter is added to the mixer. Then, 15 seconds from start of addition of the Adhesion Promoter, 16.5 grams of premixed acid Carboxylic Acid Copolymer 1/Citric Acid at a ratio of (15.7 g) with Catalyst 1 (0.7 grams) and Catalyst 2 (0.2 grams) are added simultaneously with 6.8 grams of Isocyanate over a period of 1.25 minutes. Antiblock (5.0 grams) is sprinkled over a period of 15 seconds while the Sand is being mixed. The mixer is stopped after 45 seconds. Material is emptied onto a tray and allowed to cool.

Working Example 10 has a coated structure that includes LOI ~3%, polyamide based coating, isocyanate index of 2, and cycle time of 4 minutes. The sample is prepared using 750 grams of the Sand is heated in an oven to 160° C., then introduced into the KitchenAid® mixer. After the temperature of the Sand reaches 135° C., 0.6 mL of the Adhesion Promoter is added to the mixer. Then, 15 seconds from start of addition of the Adhesion Promoter, 13.0 grams of pre-mixed acid Carboxylic Acid Copolymer 2 (12.0 grams) with Catalyst 1 (0.8 grams) and Catalyst 2 (0.2 grams) is added simultaneously with 10.5 grams of Isocyanate over a period of 1.25 minutes. Antiblock (5.0 grams) is sprinkled over a period of 15 seconds while the Sand is being mixing. The mixer is stopped after 45 seconds. Material is emptied onto a tray and allowed to cool.

Working Example 11 has a coated structure that includes LOI ~3%, polyamide based coating, isocyanate index of 1, and cycle time of 4.5 minutes. The sample is prepared using 750 grams of the Sand is heated in an oven to 160° C., then introduced into the KitchenAid® mixer. After temperature of the Sand reaches 135° C., 0.6 mL of the Adhesion Promoter is added to the mixture. Then, 15 seconds from start of addition of the Adhesion Promoter, 20.9 grams of premixed acid Carboxylic Acid Copolymer 1/Citric Acid at a ratio of 9:1 (16.5 g) with Catalyst 1 (0.7 grams) and Zinc Oxide (3.7 grams) is added simultaneously with 6.2 grams of Isocyanate over a period of 2 minutes. The mixer is stopped after 2.25 minutes. Material is emptied onto a tray and allowed to cool.

Comparative Example C is prepared in an analogous manner to Working Example 11, without the Zinc Oxide.

The effect of the amide based coatings of Working Examples 1 to 8 on bonding properties, relative to Comparative Examples A and B, are shown in Table 2, below. The coated samples are placed in a compression mold and treated with water or 2% KCl (~1 mL for every 7.5 grams of the coated sample). The outer surface of the mold is heated to the indicated temperature using a heat tape and compressed at 1000 psi for 12 hours. Upon demolding, the compressed sample is referred to as a "plug" and is placed in an electromechanical tester and the yield stress (UCS) is measured using a 22 lb load cell at strain rate of 0.01"/min. The UCS values range from 4 to 69 psi depending on the index and LOI. Comparative Example A is prepared with no citric acid and did not form a plug.

Unconfined compressive strength (UCS) is measured using an MTS Insight electromechanical compression tester. More specifically, for forming the "plug", the customized molds (3 parts-1 inch inner diameter, 1⅜" outer diameter) are obtained from Collin Instruments, the pressure is controlled using a hot press (----), and the temperature is controlled using a heat tape from (Brisk Heat). Solid wax is used around the sides of the molds to provide lubrication aiding in the removal of the plugs from the mold. Typically, 25-30 grams of coated sample is poured into the mold after locking the mold at the bottom (sealing the mold at the bottom using Teflon tape), heat tape is wrapped around the mold. Subsequently, 3-5 ml of water or 2% aqueous KCl solution is poured into the mold. The top part of the mold is then inserted and the assembly is placed inside the hot press. The hot press pressure is setup at the desired pressure (e.g., 0.785 k lbs=1000 psig pressure on the mold), temperature (normally set at 90° F.) and time (12 hours). After the coated sample is compressed at a certain temperature, pressure, and time, the resultant sample plug is pushed out of the mold and allowed to dry overnight before the UCS measurements is performed. Though, for Comparative Example B, The UCS value is quoted from the technical data sheet of Fairmount Santrol. For Working Example 1, the sample is left at 50° C. for three days prior to UCS measurement. For Working Example 3, the sample is left at ambient conditions for five hours prior to UCS measurement.

Dry compressive strength is measured to evaluate the flowability of Working Examples 9 and 10, which include the anti-blocking agent.

TABLE 3

| Ex. | Dry Compressive Strength (14 psi for 6 hours at 60° C.) | Unconfined Compressive Strength (1000 psi for 12 hours at 50° C.) |
|---|---|---|
| 9 | Weak | 21 |
| 10 | None | 21 |

Coating compositions for hydrogen sulfide capture are further examined. In particular, in order to evaluate the ability of amide based coatings to serve as an effective matrix for $H_2S$ capture, a proppant sample containing Zinc Oxide nanoparticles is prepared. The Zinc Oxide nanopowder is dispersed in the polyacid resin (~28 parts per 100 parts of resin). Referring to Example 11 and Comparative Example 11, a process involving simultaneous injection of polyacid and polyisocyanate onto a rapidly stirred mixture of hot sand particles is utilized to prepare the samples. Relative to Comparative Example C, Working Example 11 shows 100% capture of H2S in 1 h at 70° C.

TABLE 4

| Ex. | Temperature (° C.) | Zinc Oxide in Coating (wt %) | $H_2S$ capture |
|---|---|---|---|
| C | 70 | — | 20 |
| 11 | 70 | 0.5 | 100 |

$H_2S$ capture is measured by gas chromatography and the percent capture is based on the vapor-liquid equilibrium assumption. The initial head space concentration of $H_2S$ is 3133 ppmv. The media used for the test is deionized water and the proppant concentration is 20 wt %. Hydrogen sulfide capture studies are performed, by using 2.0 grams of each sample, which is weighted into a 22-mL headspace GC vial with a stir bar. Deionized water (10 mL) is then added into

TABLE 2

| Ex. | Temperature (° C.) | Media | Unconfined Compressive Strength (1000 psi for 12 hours) |
|---|---|---|---|
| A | 50 | Water | Not measurable |
| B | 43 | 2 wt % KCL | 21 |
| 1 | 50 | 2 wt % KCL | 69 |
| 2 | 50 | 2 wt % KCL | 54 |
| 3 | 60 | 2 wt % KCL | 20 |
| 4 | 50 | 2 wt % KCL | 20 |
| 5 | 50 | 2 wt % KCL | 20-26 |
| 6 | 50 | 2 wt % KCL | 7 |
| 7 | 50 | 2 wt % KCL | 7 |
| 8 | 50 | 2 wt % KCL | 10 | each vial and sealed with a PTEF lined silicon crimp cap. Hydrogen sulfide gas (1.5 mL, STP equivalent to 2.28 mg) is injected into the headspace of each vial. The vials are then heated at 70° C. in an aluminum heating block on top of a stirring hot plate for 1 hour, after which the vials are cooled and the $H_2S$ concentrations in the headspace of the vials are analyzed by headspace gas chromatography. Each sample is prepared in duplicate.

The invention claimed is:

1. A coated proppant, comprising:
a base substrate; and
one or more amide based coatings on an outer surface of the base substrate, the amide based coating including the reaction product of an isocyanate component that includes at least one isocyanate and an isocyanate-reactive component that includes one or more poly-carboxylic acids, wherein the one or more poly-carboxylic acids is a poly-carboxylic acid copolymer that is the reaction product of one or more polyether polyols and one or more anhydrides.

2. The coated proppant as claimed in claim 1, wherein the poly-carboxylic acid copolymer includes two or more carboxylic acid end groups and an ether backbone.

3. The coated proppant as claimed in claim 2, wherein the ether backbone is non-reactive with the isocyanate-component.

4. The coated proppant as claimed in claim 2, wherein the poly-carboxylic acid copolymer has a number average molecular weight from 90 g/mol to 10,000 g/mol.

5. The coated proppant as claimed in claim 1, wherein the one or more amide based coatings account for 0.5 wt % to 5.0 wt % of a total weight of the coated proppant.

6. The coated proppant as claimed in claim 1, wherein the coated proppant has an Unconfined Compressive Strength, as measured at 1000 psi for 12 hours, of greater than 15 psi at 50° C.

7. The coated proppant as claimed in claim 1, wherein the coated proppant contains heavy metal recovery crystals or sulfide capturing agents embedded within the amide based coating.

8. The coated proppant as claimed in claim 1, wherein the coated proppant further comprises one or more coatings on an outer surface of the proppant, the one or more coatings including one or more well treatment agents and one or more controlled release polymer resins, each well treatment agent being at least one selected from the group of a scale inhibitor, a wax inhibitor, a pour point depressant, asphaltene inhibitor, an asphaltene dispersant, a corrosion inhibitor, a biocide, a viscosity modifier, and a de-emulsifier, and each controlled release polymer resin formed from the reaction product of an isocyanate component that includes at least one isocyanate and an isocyanate-reactive component that includes one or more poly-carboxylic acids.

9. The coated proppant as claimed in claim 1, wherein the amide based coating includes an antiblocking additive.

10. A process of coating a proppant, the process comprising:
providing a base substrate; and
forming one or more amide based coatings on an outer surface of the base substrate, the amide based coating including the reaction product of an isocyanate component that includes at least one isocyanate and a carboxylic acid component that includes one or more poly-carboxylic acids, wherein the one or more poly-carboxylic acids is a poly-carboxylic acid copolymer that is the reaction product of one or more polyether polyols and one or more anhydrides.

* * * * *